United States Patent
Da et al.

(10) Patent No.: US 11,218,982 B2
(45) Date of Patent: Jan. 4, 2022

(54) RADIO LINK MONITORING METHOD AND APPARATUS

(71) Applicant: China Academy of Telecommunications Technology, Beijing (CN)

(72) Inventors: Ren Da, Beijing (CN); Bin Ren, Beijing (CN); Fang-Chen Cheng, Beijing (CN); Zheng Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 41 days.

(21) Appl. No.: 16/623,349

(22) PCT Filed: Apr. 17, 2018

(86) PCT No.: PCT/CN2018/083400
§ 371 (c)(1),
(2) Date: Dec. 16, 2019

(87) PCT Pub. No.: WO2018/228045
PCT Pub. Date: Dec. 20, 2018

(65) Prior Publication Data
US 2020/0178187 A1    Jun. 4, 2020

(30) Foreign Application Priority Data
Jun. 16, 2017    (CN) .......................... 201710459267.0

(51) Int. Cl.
*H04W 56/00*    (2009.01)
*H04W 24/08*    (2009.01)

(52) U.S. Cl.
CPC ......... *H04W 56/001* (2013.01); *H04W 24/08* (2013.01)

(58) Field of Classification Search
None
See application file for complete search history.

(56) References Cited

U.S. PATENT DOCUMENTS

| | | |
|---|---|---|
| 2014/0098761 A1 | 4/2014 | Lee et al. |
| 2014/0226650 A1 | 8/2014 | Miao et al. |
| 2016/0249307 A1 | 8/2016 | Thangarasa et al. |
| 2017/0048772 A1* | 2/2017 | Gheorghiu ............ H04W 76/28 |
| 2018/0351611 A1* | 12/2018 | Nagaraja ........... H04W 56/0065 |

FOREIGN PATENT DOCUMENTS

| | | |
|---|---|---|
| CN | 102119562 A | 7/2011 |
| CN | 102656926 A | 9/2012 |

(Continued)

OTHER PUBLICATIONS

Ericsson: "Beam Recovery in NR", 3GPP TSG-RAN WG2 #97bis, R2-1704090, Hangzhou, China, May 19, 2017.

(Continued)

*Primary Examiner* — Ayanah S George
(74) *Attorney, Agent, or Firm* — Foley & Lardner LLP

(57) ABSTRACT

Disclosed in the present application are a radio link monitoring method and apparatus, the method comprising: when a UE performs radio link monitoring, the UE monitors a downlink signal of a primary serving cell to obtain monitoring results; and the UE compares the monitoring results with an required synchronization threshold to determine whether the UE is in a synchronized state; the synchronization threshold is determined on the basis of preset parameters. The present invention solves the problems in the prior art of the complexity of defining RLM performance requirements, and being unable to provide the needed flexibility for supporting different specific systems by means of adjusting thresholds.

11 Claims, 3 Drawing Sheets

---

101
When UE performs radio link monitoring, the UE monitors a downlink signal of a primary serving cell to obtain a monitoring result

↓

102
The UE compares the monitoring result with an obtained in-sync threshold to determine whether the UE is in an in-sync status, wherein the in-sync threshold is obtained according to mapping of the BLER of SSB received by the UE

(56) References Cited

FOREIGN PATENT DOCUMENTS

| CN | 104904293 A | 9/2015 | | |
|---|---|---|---|---|
| JP | 2009-544177 A | 12/2009 | | |
| JP | 2015-537422 A | 12/2015 | | |
| JP | 2019-504578 A | 2/2019 | | |
| WO | WO-2014107847 A1 * | 7/2014 | ............. | H04L 1/203 |
| WO | WO 2014/164946 A1 | 9/2014 | | |
| WO | WO-2015/116870 A1 | 8/2015 | | |
| WO | WO-2017/136666 A1 | 8/2017 | | |

OTHER PUBLICATIONS

Catt: "NR Radio Link Monitoring", 3GPP Draft; RI-1707467, 3RD Generation Partnership Project (3GPP), Mobile Competence Centre ; 650, Route Des Lucioles ; F-06921 Sophia-Antipolis Cedex ; France vol. RAN WGI, No. 89 Hangzhou; May 14, 2017-May 17, 2017 May 14, 2017 (May 14, 2017), XP051272675.
Intel Corporation, "Discussion on NR Radio Linking Monitoring,"3GPP TSG RAN WG1 Meeting RAN1 #89, R1-1707346, Hangzhou, P.R. China, May 15-19, 2017.
NTT Docomo, Inc., "Discussion on NR RLM and RLF,"3GPP TSG RAN WG1 Meeting #89, R1-1708446, Hangzhou, P.R. China, May 15-19, 2017.
Interdigital Communications, "RLM for NR,"3GPP TSG RAN WG2 #97bis, R2-1702875, Spokane, USA, May 3-7, 2017.
Catt, "CR for RLM requirement for high speed conditions,"3GPP TSG RAN WG4 Meeting #80bis, R4-167527, Ljubljana, Slovenia, Oct. 10-14, 2016.

* cited by examiner

RADIO LINK MONITORING METHOD AND APPARATUS

This application is a US National Stage of International Application No. PCT/CN2018/083400, filed Apr. 17, 2018, which claims priority to Chinese patent application No. 201710459267.0, filed with Chinese Patent Office on Jun. 16, 2017, entitled "Radio Link Monitoring Method and Apparatus", which is incorporated herein by reference in its entirety.

FIELD

The present application relates to the technical field of communications, in particular to a radio link monitoring method and an apparatus.

BACKGROUND

The radio link monitoring (RLM) function is to monitor the quality of a downlink signal of a primary serving cell by user equipment (UE) to determine whether the UE is in an in-sync or out-of-sync status.

The existing LTE RLM design and implementation is specifically: defining a hypothetical physical downlink control channel (hypothetical PDCCH) and giving block error rates (BLERs) of the hypothetical PDCCH corresponding to an in-sync threshold and an out-of-sync threshold; in the UE design, the mapping from the BLER of the hypothetical PDCCH to the in-sync threshold or the out-of-sync threshold is implemented; in the UE RLM operation, the downlink radio link quality is measured from a cell specific reference signal (CRS), and a measurement result is compared with the in-sync threshold and the out-of-sync threshold to determine whether the UE is in an in-sync or out-of-sync status.

In a long term evolution (LTE) system, the UE can implement RLM by estimating the quality of the CRS. The in-sync threshold $Q_{in}$ and the out-of-sync threshold $Q_{out}$ of the UE are judged to correspond to the BLERs of 10% and 2% of the hypothetical PDCCH.

A 5G new radio (NR) system at present is much more complicated than LTE. 5G NR needs to support operation from low to high frequency bands and support a wider range of radio link services through beamforming, and has different link delay, data rate and reliability requirements, etc. Therefore, the NR cannot implement RLM by adopting a method based on a fixed hypothesis PDCCH. In addition, a synchronization signal (SS)/physical broadcast channel (PBCH) block (SS/PBCH block, SSB) of the NR does not include a PDCCH. If RLM is implemented by using the method provided in the LTE, a hypothetical PDCCH needs to be defined separately to implement mapping from an actual PDCCH BLER to an in-sync threshold $Q_{in}$ or out-of-sync threshold $Q_{out}$. In such a solution, a RLM test cannot be carried out simultaneously with an NR PDCCH performance test, and RLM performance requirements are complex to define and it cannot provide the desired flexibility by adjusting a threshold to support different specific systems.

SUMMARY

The present application provides a radio link monitoring method and an apparatus to solve the problems in the prior art of the complexity of defining RLM performance requirements, and being unable to provide the desired flexibility by adjusting a threshold to support different specific systems.

In a first aspect, the present application provides a radio link monitoring method. When a user equipment (UE) performs radio link monitoring, the method includes:

monitoring, by the UE, a downlink signal of a primary serving cell to obtain a monitoring result; and comparing, by the UE, the monitoring result with an obtained in-sync threshold to determine whether the UE is in an in-sync status, wherein the in-sync threshold is determined based on a preset parameter value.

In an optional implementation, before comparing, by the UE, the monitoring result with an obtained in-sync threshold to determine whether the UE is in an in-sync status, the method further includes:

determining, by the UE, the in-sync threshold according to mapping of a block error rate (BLER) of a synchronization signal (SS)/physical broadcast channel (PBCH) block (SS/PBCH block, SSB) received by the UE; or determining, by the UE, the in-sync threshold according to a parameter value pre-configured by a network-side device.

In an optional implementation, the BLER of the SSB is a BLER of a new radio (NR) PBCH.

In an optional implementation, before determining, by the UE, the in-sync threshold according to mapping of the BLER of the SSB received by the UE, the method further includes:

calculating the BLER of the SSB using a primary synchronization signal (PSS) and a secondary synchronization signal (SSS) or a PBCH demodulation reference signal (DMRS) for a preset beam direction in each SSB.

In an optional implementation, before calculating the BLER of the SSB, the method further includes:

when the UE is in an idle mode or a connected mode, determining a transmission period of the PSS, SSS, or PBCH DMRS according to configuration information transmitted by the network-side device.

In an optional implementation, the transmission period corresponds to a moving speed of the UE, wherein the transmission period corresponding to a first moving speed is smaller than the transmission period corresponding to a second moving speed, and the first moving speed is greater than the second moving speed.

In an optional implementation, after comparing, by the UE, the monitoring result with the obtained in-sync threshold, the method further includes:

when the UE receives a signal instruction to adjust the in-sync threshold, transmitted by the network-side device, adjusting the in-sync threshold according to the signal instruction.

In an optional implementation, monitoring, by the UE, the downlink signal of the primary serving cell to obtain the monitoring result includes:

monitoring, by the UE, a reference signal received quality (RSRQ) or a signal to interference and noise ratio (SINR) of PSS, SSS and PBCH DMRS of the serving cell to obtain a monitoring result.

In a second aspect, a radio link monitoring method is provided, including:

transmitting, by a network-side device, a preset in-sync threshold to a UE through a signal instruction; and when the UE performs radio link monitoring, monitoring a downlink signal of a primary serving cell to obtain a monitoring result, and comparing the monitoring result with the preset in-sync threshold to determine whether the UE is in an in-sync status.

In a third aspect, the present application provides a user equipment, including:

a monitor unit configured to monitor a downlink signal of a primary serving cell to obtain a monitoring result; and a judgment unit configured to compare the monitoring result with an obtained in-sync threshold to determine whether the UE is in an in-sync status, wherein the in-sync threshold is determined based on a preset parameter value.

In an optional implementation, the user equipment further includes:

a determination unit configured to determine the in-sync threshold according to mapping of a block error rate (BLER) of a synchronization signal (SS)/physical broadcast channel (PBCH) block (SS/PBCH block, SSB) received by the UE; or determine the in-sync threshold according to a parameter value pre-configured by a network-side device.

In an optional implementation, the BLER of the SSB is a BLER of a new radio (NR) PBCH.

In an optional implementation, the user equipment further includes:

a BLER determination unit configured to calculate the BLER of the SSB using a primary synchronization signal (PSS), a secondary synchronization signal (SSS) or a PBCH demodulation reference signal (DMRS) for a preset beam direction in each SSB.

In an optional implementation, the BLER determination unit is further configured, when the UE is in an idle mode or a connected mode, to determine a transmission period of the PSS, SSS, or PBCH DMRS according to configuration information transmitted by the network-side device.

In an optional implementation, the transmission period corresponds to a moving speed of the UE, wherein the transmission period corresponding to a first moving speed is smaller than the transmission period corresponding to a second moving speed, and the first moving speed is greater than the second moving speed.

In an optional implementation, the user equipment further includes:

an adjustment unit configured, when receiving a signal instruction to adjust the in-sync threshold, transmitted by the network-side device, to adjust the in-sync threshold according to the signal instruction.

In an optional implementation, the monitor unit is configured to monitor a reference signal received quality (RSRQ) or a signal to interference and noise ratio (SINR) of a PSS, SSS and PBCH DMRS of the serving cell to obtain a monitoring result.

In a fourth aspect, a radio link monitoring system is provided. The system includes:

a network-side device configured to transmit a preset in-sync threshold to a UE by a signal instruction; and the user equipment (UE) configured, when performing radio link monitoring, to monitor a downlink signal of a primary serving cell to obtain a monitoring result, and compare the monitoring result with the preset in-sync threshold to determine whether the UE is in an in-sync status.

In a fifth aspect, a computer apparatus is provided, including a processor configured, when executing a computer program stored in a memory, to implement the steps of the method in the first aspect.

In a sixth aspect, a computer readable storage medium is provided, storing a computer program, wherein the computer program, when executed by a processor, implements the steps of the method in the first aspect.

The present application has the following beneficial effects.

In view of the problems in the prior art of the complexity of defining RLM performance requirements, being unable to be simultaneous with an NR PDCCH performance test, and being unable to provide the desired flexibility by adjusting a threshold to support different specific systems, the method provided in embodiments of the present application utilizes a channel and/or information in the SSB of the NR to map an in-sync or out-of-sync threshold of the UE, thereby achieving an RLM implementation in an NR system, so that it is easier for the UE to implement the determination of the in-sync threshold, and the definition of the RLM performance requirements can be simple; and the workload of testing RLM performance can be minimized.

DETAILED DESCRIPTION

Figure 1:
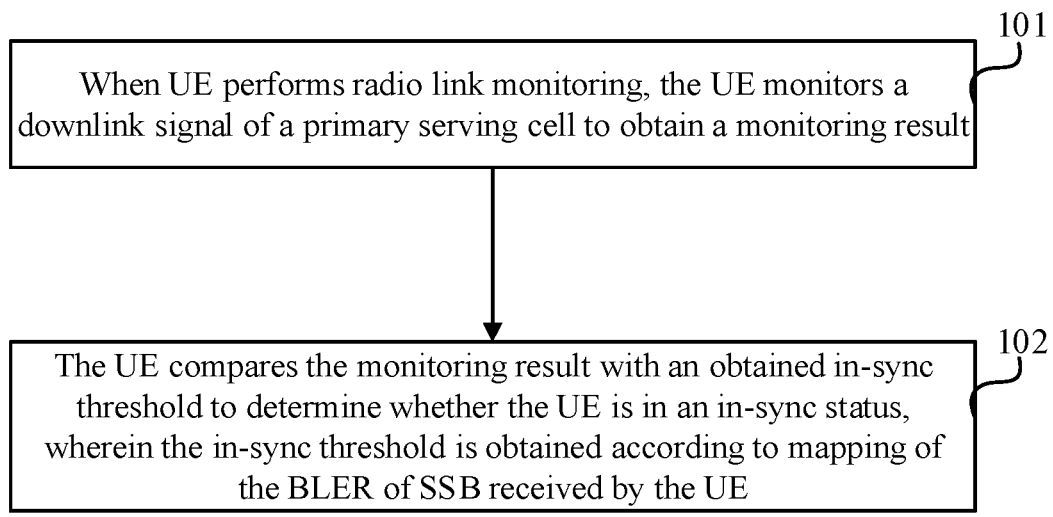
FIG. 1 shows a radio link monitoring method in accordance with a first embodiment of the present application.

To make the objects, technical solutions and advantages of the embodiments of the present invention more apparent, a clear and complete description of the technical solutions in the embodiments of the present invention will be given below in conjunction with the drawings in the embodiments of the present invention. Apparently, the embodiments described are part of, rather than all of, the embodiments of the present invention. All other embodiments obtained by those of ordinary skill in the art without creative work, based on the embodiments in the present invention, should fall into the protection scope of the present invention.

It should be understood that the technical solutions of the present invention can be applied to various communication systems, such as a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunication system (UMTS), a new radio (NR), etc.

It should also be understood that in embodiments of the present invention, user equipment (UE) includes but is not limited to a mobile station (MS), a mobile terminal, a mobile telephone, a handset, portable equipment and the like. The user equipment can communicate with one or more core networks via a radio access network (RAN). For example, the user equipment may be a mobile phone (or "cellular" phone), a computer with wireless communication function, or the like, and the user equipment may also be a portable, pocket, handheld, computer built-in or vehicle-mounted mobile device.

In embodiments of the invention, a base station (e.g. an access point) may refer to a device in an access network that communicates with a wireless terminal through one or more sectors via an air interface. The base station can be used to convert received air frames to the IP packets and used as a router between the wireless terminal and the rest of the access network, wherein the rest of the access network can include an Internet Protocol (IP) network. The base station can also coordinate attribute management of the air interface. For example, the base station may be a base transceiver station (BTS) in GSM or CDMA, or may be a base station (NodeB) in TD-SCDMA or WCDMA, or may be an evolved base station (eNodeB or eNB or e-NodeB, evolutional Node B) in LTE, or a base station (gNB) in 5G NR, but the present invention is not limited thereto.

In the solutions according to embodiments of the present application, a judgment threshold for determining whether the UE is synchronized is obtained by information in an SSB. Compared with a method of obtaining a judgment threshold by using a hypothetical PDCCH provided in the prior art, the method in the present application is simple and convenient due to that there is no need to define separately a hypothetical PDCCH. The present application provides a radio link monitoring method which, when applied to user equipment (UE) for radio link monitoring, includes the following steps: monitoring, by the UE, a downlink signal of a primary serving cell to obtain a monitoring result; and comparing, by the UE, the monitoring result with an obtained in-sync threshold to determine whether the UE is in an in-sync status, wherein the in-sync threshold is determined based on a preset parameter value.

During specific implementation, in the method according to embodiments of the present application, the in-sync threshold can be determined based on various channels and/or signals in a 5G NR (new radio) system. In embodiments of the present application, the following two ways are used as examples for description:

a. UE determines the in-sync threshold according to mapping of a block error rate (BLER) of a synchronization signal (SS)/physical broadcast channel (PBCH) block (SS/PBCH block, SSB) received by the UE; or b. UE determines the in-sync threshold according to a parameter value pre-configured by a network-side device.

The radio link monitoring method according to the embodiments of the present application is further described in detail in conjunction with the accompanying drawings.

First Embodiment

In the case that UE determines the in-sync threshold according to mapping of a block error rate (BLER) of a synchronization signal (SS)/physical broadcast channel (PBCH) block (SS/PBCH block, SSB) received by the UE, the present application provides a radio link monitoring method, which includes the following steps (a flow diagram of the method is shown in FIG. 1).

Step 101: when the UE performs radio link monitoring, the UE monitors a downlink signal of a primary serving cell to obtain a monitoring result.

Step 102: the UE compares the monitoring result with an obtained in-sync threshold to determine whether the UE is in an in-sync status, wherein the in-sync threshold is obtained according to mapping of a block error rate (BLER) of the SSB received by the UE.

As the SSB of the NR does not include a PDCCH, the RLM cannot be implemented in the hypothetical PDCCH method in the LTE. Based on the problem in the prior art, the method according to the embodiment of the present application utilizes a channel and/or information in the SSB of the NR to map to an in-sync or out-of-sync threshold of the UE, thereby implementing an RLM in an NR system.

In view of the problems in the prior art of the complexity of defining RLM performance requirements, being unable to be simultaneous with an NR PDCCH performance test, and being unable to provide the desired flexibility by adjusting a threshold to support different specific systems, the solution provided in the present application utilizes an NR physical broadcast channel (PBCH) as a channel for implementing NR RLM (i.e. the BLER of the NR PBCH is used as the BLER of the SSB), and UE RLM criteria are directly defined based on the BLER of the NR PBCH. That is, the UE determines an in-sync threshold based on a PBCH BLER of a serving beam and a predefined relationship or configuration, to determine whether the UE is in an in-sync status according to the in-sync threshold.

Compared with a method based on a hypothetical PDCCH, the method provided in the embodiment of the present application uses a PBCH included in each NR SSB. Therefore, there is no need to define a hypothetical PDCCH. In addition, it is easier for the UE to implement the mapping from the actual PBCH BLER to the in-sync threshold, and the definition of the RLM performance requirements can be simple; and the workload of testing RLM performance can be minimized, and the RLM test can be performed simultaneously with the NR PBCH performance test.

In the method provided in the present application, the in-sync threshold is obtained by using mapping of the BLER of the SSB, and further specifically, the BLER of the SSB can be obtained by using the following parameter signals, including: calculating the BLER of the SSB using a primary synchronization signal (PSS), a secondary synchronization signal (SSS) or a PBCH demodulation reference signal (DMRS) for a preset beam direction in each SSB.

NR RLM needs to support an operating environment with multiple RF beams. To support NR mobility in a multi-beam operating environment, the SSB and an SSB set are introduced to the NR. Each SSB includes a PSS, an SSS, and a PBCH for a preset beam direction. Each SSB set includes a plurality of SSBs for implementing beam scanning, and the transmission of each SSB set covers a specific area in a beam scanning operation, and the NR UE mobility is mainly based on the measurement of the SSB.

The period of the default NR SS set for initial cell search is defined to be 20 milliseconds (ms) for all carrier frequencies in the 5G NR. For a UE in an idle mode and a UE in a connected mode, a period value set of the NR SS set is {5 ms, 10 ms, 20 ms, 40 ms, 80 ms, 160 ms}.

To achieve the effect of measuring the error rate using the NR SS, the signal transmission period needs to be smaller than the measurement requirement of RLM. Therefore, in the solution provided in the present application, for a UE in an idle mode and a UE in a connected mode, the network-side device can configure the periodicity of the NR SS set according to the UE mobility its supports and the RLM requirement. The specific implementation can be as follows.

When the UE is in an idle mode or a connected mode, a transmission period of the PSS, SSS, or PBCH DMRS is determined according to configuration information transmitted by the network-side device.

The configured transmission period of the PSS, SSS, or DMRS is based on the principle that the transmission period corresponds to a moving speed of the UE, wherein the transmission period corresponding to a first moving speed is smaller than the transmission period corresponding to a second moving speed, and the first moving speed is greater than the second moving speed.

For example, when the moving speed of the UE is 30-60 Km/h, the period of the NR SS set is configured as 20 ms; and when the moving speed of the UE is 3 km/h, the period of the NR SS set is configured as 80 ms.

Further, since the in-sync threshold in the LTE RLM is implemented by the UE, and the network-side device cannot actually control how the UE sets the in-sync threshold, thus the LTE RLM design cannot support different specific systems. Therefore, the LTE RLM design is inflexible, and system performance is difficult to guarantee therein. In view of the problems in the prior art, in the solution provided in the embodiment of the present application, the network-side device can also adjust the in-sync threshold of the RLM according to specific environmental requirements. The specific implementation can be as follows.

When the network-side device determines, according to a network service currently provided to the UE, that the in-sync threshold of the RLM needs to be adjusted, the network-side device transmits an adjusted in-sync threshold to the UE through a signal instruction.

When the UE receives a signal instruction to adjust the in-sync threshold, transmitted by the network-side device, the UE adjusts the in-sync threshold according to the signal instruction. In the embodiment, the specific implementation of adjusting the in-sync threshold can be as follows: the UE obtains an in-sync threshold set by the network-side device from the signal instruction, and adjusts the original in-sync threshold using the in-sync threshold obtained from the signal instruction.

Second Embodiment

Figure 2:
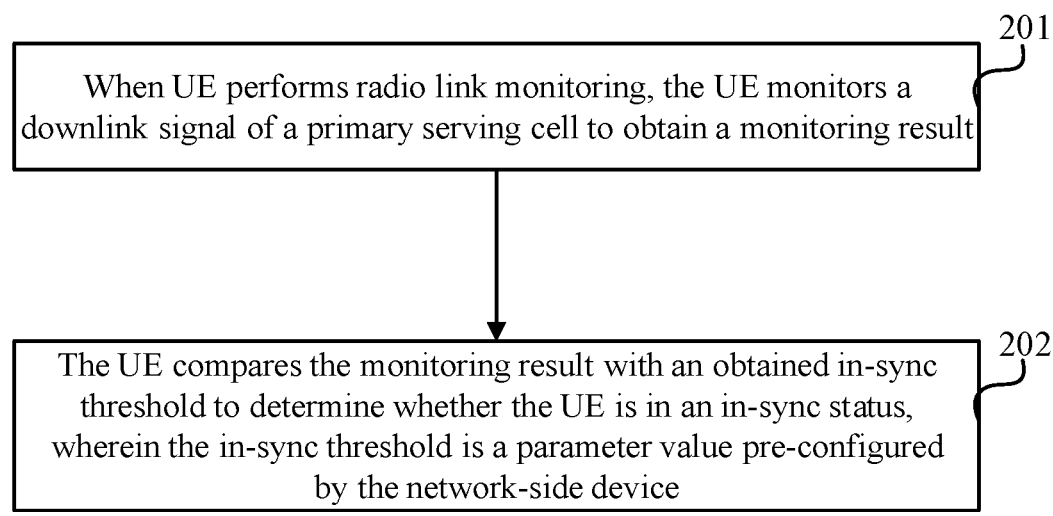
FIG. 2 shows a radio link monitoring method in accordance with a second embodiment of the present application.

To provide the flexibility for the NR RLM to support different types of systems, the present invention also proposes that a network is permitted to perform an adjustment configuration service of an in-sync threshold for each UE (the UE determines the in-sync threshold according to a parameter value pre-configured by the network-side device). The embodiment of the present application provides a radio link monitoring method (as shown in FIG. 2), including the following steps.

Step 201: when the UE performs radio link monitoring, the UE monitors a downlink signal of a primary serving cell to obtain a monitoring result.

Step 202: UE compares the monitoring result with an obtained in-sync threshold to determine whether the UE is in an in-sync status, wherein the in-sync threshold is a parameter value pre-configured by a network-side device.

In the embodiment of the present application, the network-side device directly configures the in-sync threshold of NR RLM, without mapping by the UE from a BLER of a predefined PBCH or PDCCH, and the network-side device can conveniently and timely adjust the in-sync threshold of the UE to provide the desired flexibility of RLM, thereby supporting different systems.

Although the BLER of the PDCCH is used as a judgment criterion in RLM, the BLER statistics require a long-term process, and the UE cannot calculate the BLER of the PDCCH. Therefore, during actual link monitoring and in testing, the UE cannot judge the radio link quality by calculating the error rate, and the radio link quality should be judged by using a signal to noise ratio of a received signal. Thus, in the embodiment of the present application, the in-sync threshold configured by the network-side device can be based on a reference signal received quality (RSRQ) or a signal to interference and noise ratio (SINR) of synchronization signals NR-PSS and NR-SSS, and PBCH DMRS.

The corresponding specific implementation of UE monitoring a downlink signal of a primary serving cell to obtain a monitoring result can be as follows: monitoring, by the UE, a reference signal received quality (RSRQ) or a signal to interference and noise ratio (SINR) of synchronization signals PSS, SSS and PBCH DMRS of the serving cell to obtain a monitoring result.

The method provided in the embodiment of the present application not only provides flexibility for the network to control the in-sync threshold according to supported different features, but also makes the NR RLM implementation easier. Moreover, the UE does not need to derive an in-sync threshold indicating whether it is in an in-sync status from a BLER of a predefined PBCH or PDCCH.

Third Embodiment

Figure 3:
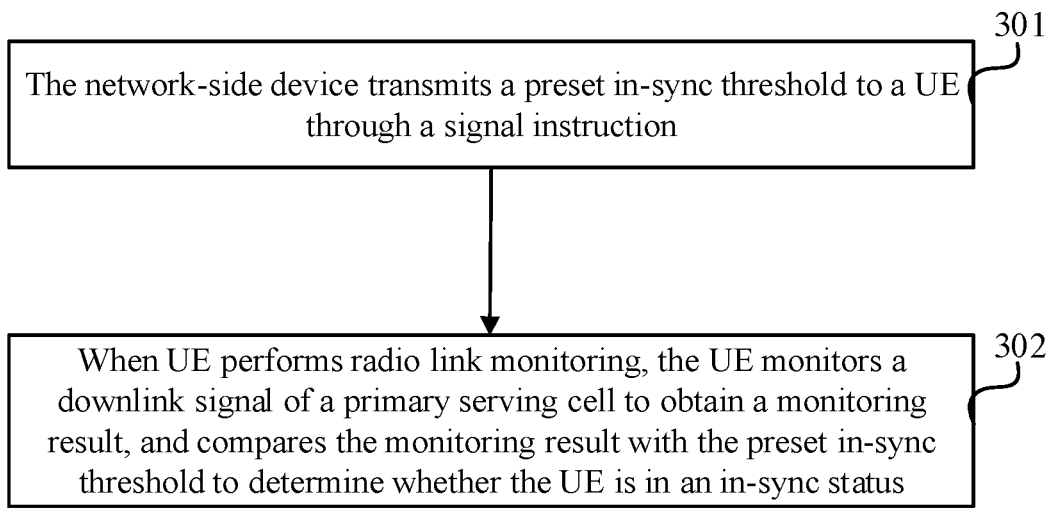
FIG. 3 shows a radio link monitoring method in accordance with a third embodiment of the present application.

As shown in FIG. 3, the present application further provides another radio link monitoring method, which can includes the following steps.

Step 301: the network-side device transmits a preset in-sync threshold to a UE by a signal instruction.

Step 302: when the UE performs radio link monitoring, the UE monitors a downlink signal of a primary serving cell to obtain a monitoring result, and compares the monitoring result with the preset in-sync threshold to determine whether the UE is in an in-sync status.

Fourth Embodiment

Figure 4:
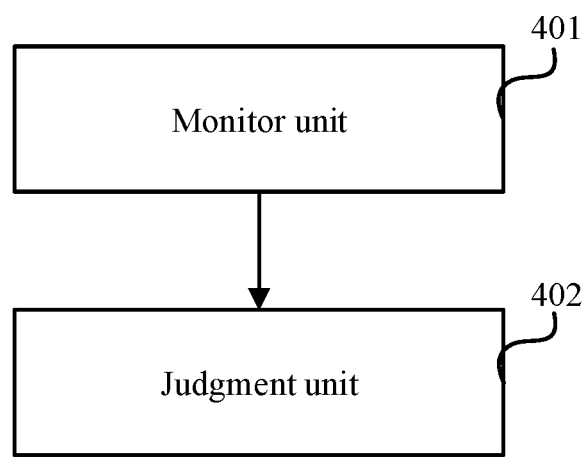
FIG. 4 shows a schematic structural diagram of user equipment in accordance with a fourth embodiment of the present application.

As shown in FIG. 4, the present application further provides a user equipment, including:

a monitor unit 401 configured to monitor a downlink signal of a primary serving cell to obtain a monitoring result; and a judgment unit 402 configured to compare the monitoring result with an obtained in-sync threshold to determine whether the UE is in an in-sync status, wherein the in-sync threshold is determined based on a preset parameter value.

Optionally, the user equipment can further include: a determination unit configured to determine the in-sync threshold according to mapping of a block error rate (BLER) of a synchronization signal (SS)/physical broadcast channel (PBCH) block (SS/PBCH block, SSB) received by the UE; or determine the in-sync threshold according to a parameter value pre-configured by a network-side device.

The BLER of the SSB is a BLER of a new radio (NR) physical broadcast channel (PBCH).

In addition, the user equipment can further include a BLER determination unit configured to calculate the BLER of the SSB using a primary synchronization signal (PSS), a secondary synchronization signal (SSS) or a PBCH demodulation reference signal (DMRS) for a preset beam direction in each SSB.

Optionally, the BLER determination unit is further configured, when the UE is in an idle mode or a connected mode, to determine a transmission period of the PSS, SSS, or PBCH DMRS according to configuration information transmitted by the network-side device.

Optionally, the transmission period corresponds to a moving speed of the UE, wherein the transmission period corresponding to a first moving speed is smaller than the transmission period corresponding to a second moving speed, and the first moving speed is greater than the second moving speed.

Optionally, the user equipment can further include: an adjustment unit configured, when receiving a signal instruction to adjust the in-sync threshold, transmitted by the network-side device, to adjust the in-sync threshold according to the signal instruction.

Although the BLER of the PDCCH is used as a judgment criterion in RLM, the BLER statistics require a long-term process, and the UE cannot calculate the BLER of the PDCCH. Therefore, during actual link monitoring and in testing, the UE cannot judge the radio link quality by calculating the error rate, and the radio link quality should be judged by using a signal to noise ratio of a received signal. Thus, in the embodiment of the present invention, the monitor unit in the user equipment is configured to monitor a reference signal received quality (RSRQ) or a signal to interference and noise ratio (SINR) of PSS, SSS and PBCH DMRS of the serving cell, to obtain a monitoring result.

Fifth Embodiment

Figure 5:
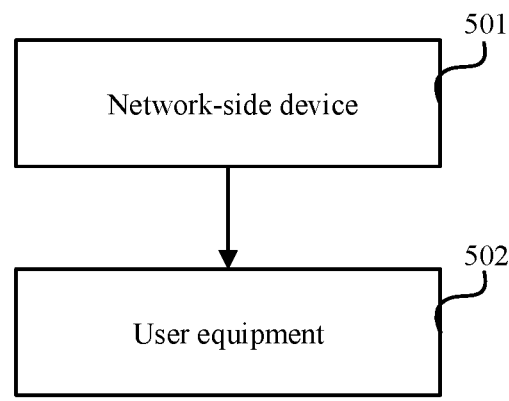
FIG. 5 shows a schematic structural diagram of a radio link monitoring system in accordance with an embodiment of the present application.

As shown in FIG. 5, the embodiment of the present application further provides a radio link monitoring system, including: a network-side device 501 configured to transmit a preset in-sync threshold to a UE by a signal instruction; and the user equipment (UE) 502 configured, when performing radio link monitoring, to monitor a downlink signal of a primary serving cell to obtain a monitoring result, and compare the monitoring result with the preset in-sync threshold to determine whether the UE is in an in-sync status.

An embodiment of the present invention further provides a computer apparatus, including a processor configured, when executing a computer program stored in a memory, to implement the steps of the method of the first, second or third embodiment.

An embodiment of the present invention further provides a computer readable storage medium, storing a computer program, wherein the computer program, when executed by a processor, implements the steps of the method of the first, second or third embodiment.

As the SSB of the NR does not include a PDCCH, the RLM cannot be implemented in the hypothetical PDCCH method provided in the LTE. Based on the problem in the prior art, the method provided in the embodiment of the present application utilizes a channel and/or information in the SSB of the NR to map to an in-sync or out-of-sync threshold of the UE, thereby implementing an RLM in an NR system.

Compared with a method using a hypothetical PDCCH, the method provided in the embodiment of the present application uses a PBCH included in each NR SSB. Therefore, there is no need to define a hypothetical PDCCH. In addition, it is easier for the UE to implement the mapping from the actual PBCH BLER to the in-sync threshold, so that the definition of the RLM performance requirements can be simple; and the workload of testing RLM performance can be minimized, and the RLM test can be performed simultaneously with the NR PBCH performance test.

Figure 6:
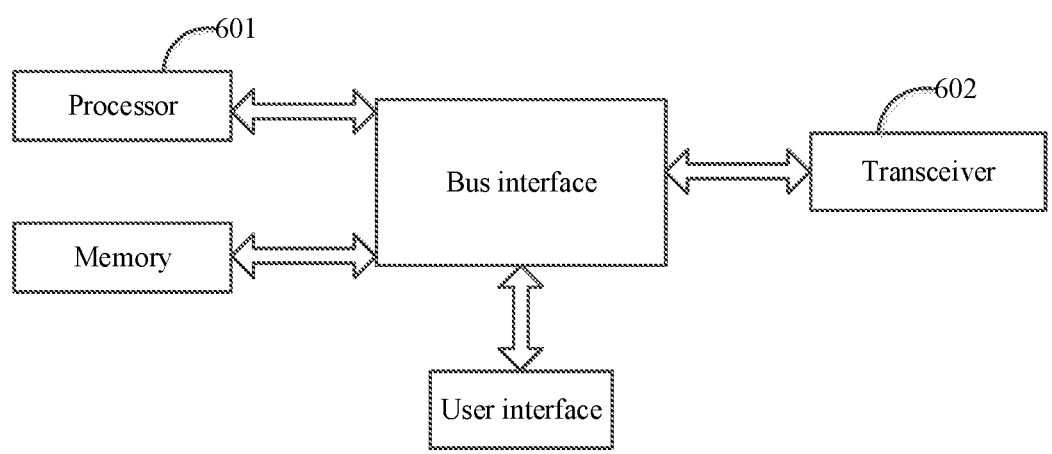
FIG. 6 shows a physical structural diagram of user equipment in accordance with an embodiment of the present invention.

Based on the above embodiment, referring to FIG. 6, in an embodiment of the present invention, the user equipment includes a processor 601 and a transceiver 602.

The processor 601 is configured to read a program in a memory to execute the following process: monitoring a downlink signal of a primary serving cell to obtain a monitoring result; and comparing the monitoring result with an obtained in-sync threshold to determine whether the UE is in an in-sync status, wherein the in-sync threshold is determined based on a preset parameter value.

The transceiver 602 is configured to receive and transmit data under the control of the processor 601.

In FIG. 6, a bus architecture can include any number of interconnected buses and bridges, and links various circuitry together including one or more processors represented by the processor 601 and memories represented by a memory. The bus architecture can also links various other circuitry together such as a peripheral device, a voltage stabilizer and a power management circuit, which are all known in the art and thus not further described herein. A bus interface provides an interface. The transceiver 602 can be a plurality of elements, that is, including a transmitter and a receiver, to provide a unit for communicating with various other devices through a transmission medium. For different user equipments, the user interface can also be an interface capable of externally or internally connecting a required device, including but not limited to a keypad, a display, a speaker, a microphone, a joystick, or the like.

The processor 601 is responsible for managing the bus architecture and usual processing, and the memory can store data for use when the processor 601 is performing operations.

Optionally, before the processor 601 compare the monitoring result with the obtained in-sync threshold to determine whether the UE is in an in-sync status, the processor 601 determines the in-sync threshold according to mapping of a block error rate (BLER) of a synchronization signal (SS)/physical broadcast channel (PBCH) block (SS/PBCH block, SSB) received by the UE; or the processor 601 determines the in-sync threshold according to a parameter value pre-configured by a network-side device.

Optionally, the BLER of the SSB is a BLER of a new radio (NR) physical broadcast channel (PBCH).

Optionally, before determining the in-sync threshold according to mapping of a block error rate (BLER) of SSB received by the processor 601, the processor 601 is further configured to: calculate the BLER of the SSB using a primary synchronization signal (PSS), a secondary synchronization signal (SSS), or a PBCH demodulation reference signal (DMRS) for a preset beam direction in each SSB.

Optionally, before calculating the BLER of the SSB, the processor 601 is further configured: when the UE is in an idle mode or a connected mode, to determine a transmission period of the PSS, SSS, or PBCH DMRS according to configuration information transmitted by the network-side device.

Optionally, the transmission period determined by the processor 601 corresponds to a moving speed of the UE, wherein the transmission period corresponding to a first moving speed is smaller than the transmission period corresponding to a second moving speed, and the first moving speed is greater than the second moving speed.

Optionally, after the processor 601 compares the monitoring result with an obtained in-sync threshold to implement radio link monitoring, the processor 601 is further configured, when receiving a signal instruction to adjust the in-sync threshold, transmitted by the network-side device, to adjust the in-sync threshold according to the signal instruction.

Optionally, when monitoring a downlink signal of a primary serving cell to obtain a monitoring result, the processor 601 is configured to: monitor a reference signal received quality (RSRQ) or a signal to interference and noise ratio (SINR) of PSS, SSS or PBCH DMRS of the serving cell to obtain a monitoring result.

Those skilled in the art should understand that the embodiments of the present invention can be provided as a method, a system or a computer program product. Therefore, the present invention may be in the form of an all-hardware embodiment, an all-software embodiment, or a software and hardware combined embodiment. Moreover, the present invention may also be in the form of a computer program product that can be implemented on one or more computer usable storage media (including but not limited to magnetic disk memories, CD-ROMs, optical memories) containing computer usable program codes.

The present invention is described with reference to the flow diagrams and/or block diagrams of the method, device (system) and computer program product of the embodiments of the present invention. It should be understood that each process and/or block in the flow diagrams and/or block diagrams, as well as combinations of processes and/or blocks in the flow diagrams and/or block diagrams can be implemented by computer program instructions. The computer program instructions can be provided to a processor of a general purpose computer, a special purpose computer, an embedded processor or other programmable data processing device to produce a machine, so that the instructions processed by the processor of the computer or other programmable data processing device generates a device for achieving functions specified in one or more processes of the flow diagrams and/or one or more blocks of the block diagrams.

The computer program instructions may also be stored in a computer readable memory that can instruct a computer or other programmable data processing device to operate in a specified manner, so that the instructions stored in the computer readable memory generates a manufacture containing an instruction device, wherein the instruction device achieves the functions specified in one or more processes of the flow diagrams and/or one or more blocks of the block diagrams.

The computer program instructions can also be loaded to a computer or other programmable data processing device, so that a series of operation steps are executed on the computer or other programmable data processing device to generate computer implemented processing, so that the instructions executed on the computer or other programmable data processing device provide steps for achieving functions specified in one or more processes of the flow diagrams and/or one or more blocks of the block diagrams.

The preferred embodiments of the present invention are described above; however, with basic creative concepts, those skilled in the art can make additional variations and modifications to these embodiments. Therefore, the appended claims are intended to be interpreted as including the preferred embodiments and all variations and modifications within the scope of the present invention.

Apparently, those skilled in the art can make changes and modifications to the embodiments of the present invention without departing from the spirit and scope of the present invention. As such, the present invention is also intended to encompass these changes and modifications if such changes and modifications of the present invention are within the scope of the claims of the present invention and equivalents thereof.

The invention claimed is:

1. A radio link monitoring method, wherein when a user equipment (UE) performs radio link monitoring, the method comprises:
monitoring, by the UE, a downlink signal of a primary serving cell to obtain a monitoring result;
calculating a block error rate (BLER) of a synchronization signal (SS)/physical broadcast channel (PBCH) block (SS/PBCH block, SSB) using a primary synchronization signal (PSS), a secondary synchronization signal (SSS) or a PBCH demodulation reference signal (DMRS) for a preset beam direction in each SSB;
determining, by the UE, an in-sync threshold according to mapping of the BLER of the SSB received by the UE; and
comparing, by the UE, the monitoring result with the in-sync threshold to determine whether the UE is in an in-sync status.

2. The method of claim 1, wherein the BLER of the SSB is a BLER of a new radio (NR) PBCH.

3. The method of claim 1, wherein before calculating the BLER of the SSB, the method further comprises:
when the UE is in an idle mode or a connected mode, determining a transmission period of the PSS, SSS, or PBCH DMRS according to configuration information transmitted by the network-side device.

4. The method of claim 3, wherein the transmission period corresponds to a moving speed of the UE, wherein the transmission period corresponding to a first moving speed is smaller than the transmission period corresponding to a second moving speed, and the first moving speed is greater than the second moving speed.

5. The method of claim 1, wherein after comparing, by the UE, the monitoring result with the in-sync threshold, the method further comprises:
when the UE receives a signal instruction to adjust the in-sync threshold, transmitted by the network-side device, adjusting the in-sync threshold according to the signal indication.

6. A user equipment, comprising: a processor, wherein the processor is configured to: monitor a downlink signal of a primary serving cell to obtain a monitoring result;
calculate a block error rate (BLER) of a synchronization signal (SS)/physical broadcast channel (PBCH) block (SS/PBCH block, SSB) using a primary synchronization signal (PSS), a secondary synchronization signal (SSS) or a PBCH demodulation reference signal (DMRS) for a preset beam direction in each SSB;
determine an in-sync threshold according to mapping of the BLER of the SSB received by the UE; and
compare the monitoring result with the in-sync threshold to determine whether the UE is in an in-sync status.

7. The user equipment of claim 6, wherein the BLER of the SSB is a BLER of a new radio (NR) PBCH.

8. The user equipment of claim 6, wherein the processor is further configured, when the UE is in an idle mode or a connected mode, to determine a transmission period of the PSS, SSS, or PBCH DMRS according to configuration information transmitted by the network-side device.

9. The user equipment of claim 8, wherein the transmission period corresponds to a moving speed of the UE, the transmission period corresponding to a first moving speed is smaller than the transmission period corresponding to a second moving speed, and the first moving speed is greater than the second moving speed.

10. The user equipment of claim 6, wherein the processor is further configured to:
when the UE receives a signal indication for adjusting the in-sync threshold, transmitted by the network-side device, adjust the in-sync threshold according to the signal indication.

11. A non-transitory computer readable storage medium, storing a computer program, wherein the computer program, when executed by a processor, implements the steps of the method of claim 1.

\* \* \* \* \*